April 29, 1952         H. FELDMAN         2,594,896
COMBINED DRINKING GLASS COASTER AND STRAW GUIDE
Filed Feb. 25, 1950         2 SHEETS—SHEET 1
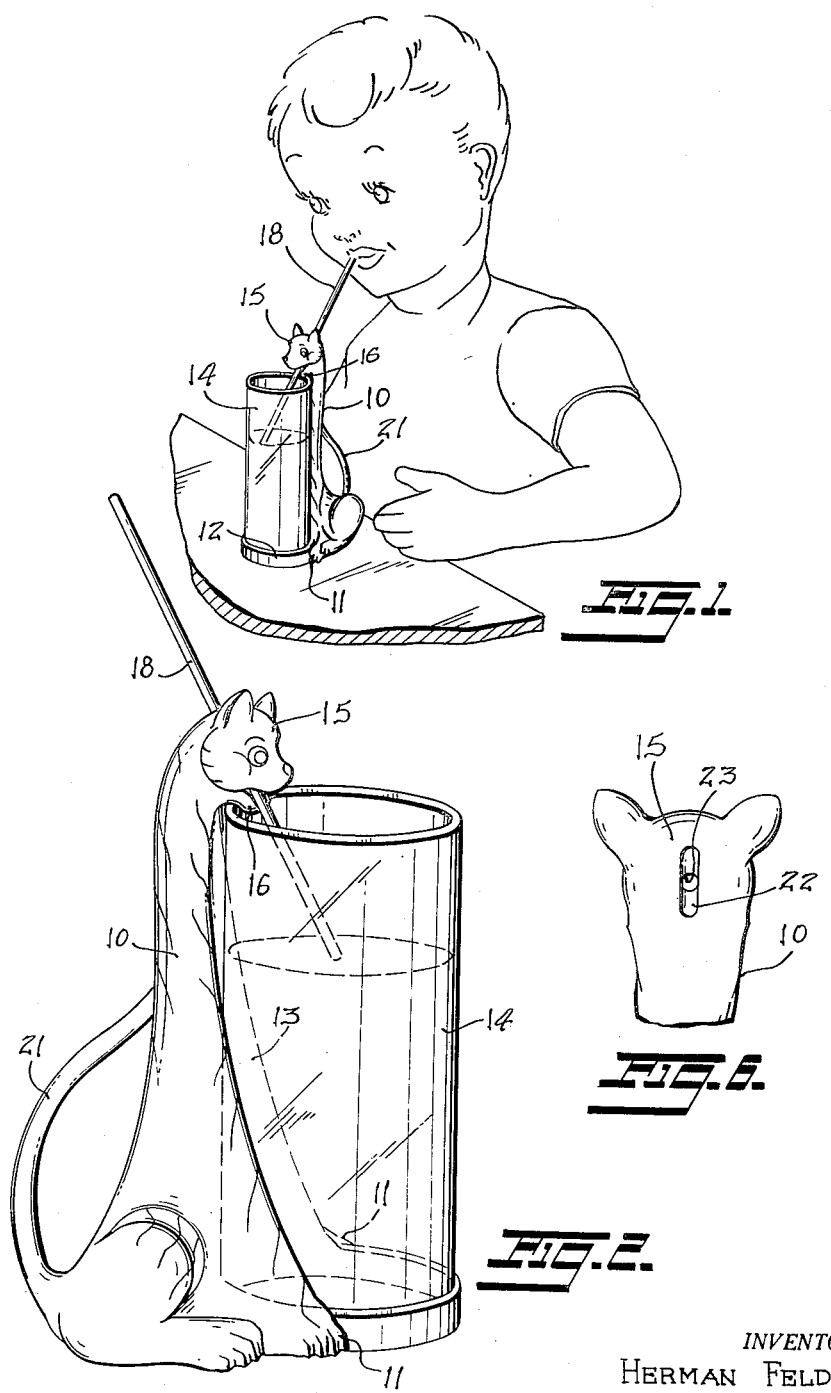
INVENTOR.
HERMAN FELDMAN
BY
ATTORNEY April 29, 1952  H. FELDMAN  2,594,896
COMBINED DRINKING GLASS COASTER AND STRAW GUIDE
Filed Feb. 25, 1950  2 SHEETS—SHEET 2

INVENTOR.
HERMAN FELDMAN
BY
ATTORNEY

Patented Apr. 29, 1952

2,594,896

UNITED STATES PATENT OFFICE 2,594,896

COMBINED DRINKING GLASS COASTER AND STRAW GUIDE

Herman Feldman, Forest Hills, N. Y.

Application February 25, 1950, Serial No. 146,201

2 Claims. (Cl. 65—61)

This invention relates to a combined drinking glass coaster and drinking straw guide and is particularly applicable in the service of drinks to children.

The principal object of the invention is the provision of a coaster integral with and preferably forming part of a novelty figurine which also has formed therein a drinking straw guide to be utilized in sipping the contents of a glass placed in the coaster through an ordinary drinking straw.

Another object of the invention is the provision of handle means integral with and forming part of the said figurine.

Still another object of the invention is to construct the coaster so that when a glass is placed therein it can not be jostled free with the resultant breakage thereof or the spilling of its contents or both.

A modified form of the invention has for its object the provision of drinking straw guide means adapted to positioning the straw at the most advantageous angle relative to the diminishing contents of the glass.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the coaster of the invention in use.

Fig. 2 is an enlarged perspective view of the coaster.

Fig. 6 is a fragmentary view in the direction of the arrow in Fig. 5.

Figure 3:
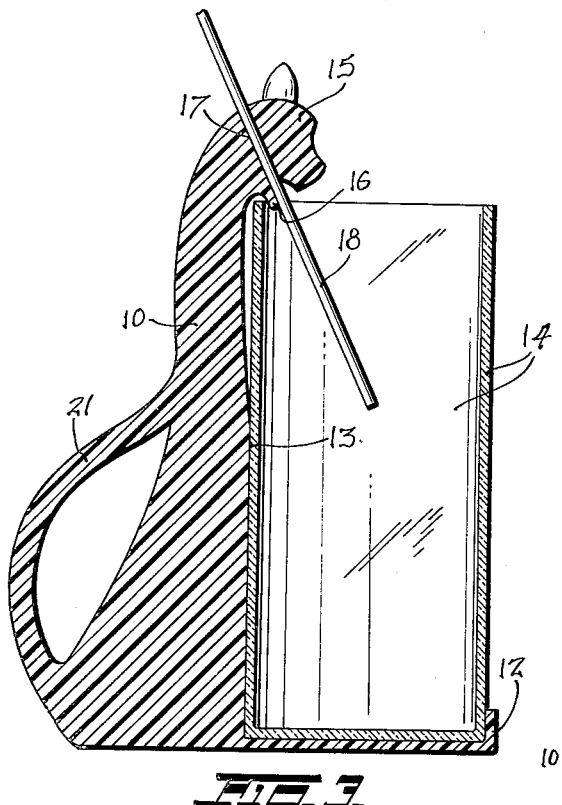
Fig. 3 is a center sectional view of the device of Fig. 2.

The combined coaster and straw guide, according to the first form of the present invention, shown in Figs. 1 to 3, includes a one-piece body 10 of plastic or the like material and in the form of a novel figurine. The one-piece body 10 has a flat bottom to provide a stable base. In the illustrated instance of the invention the body 10 is in the form of a cat holding between its paws 11 a cup-shaped coaster portion 12, formed integral therewith. The under body portion 13 (the righthand side in Figs. 2 and 3) of the figurine is curved concavely to fit the outline of a glass 14 placed in the coaster 12, so that for a portion of its periphery the wall of the coaster extends upwardly in contact with the glass for a considerable distance.

The head 15 of figurine 10 projects above the glass 14 with a chin or depending portion 16 extending downward below the lip of the glass so that the latter is effectively locked to the figurine. To place the glass 14 in the coaster the lip thereof is slipped up behind the chin or depending portion 16 sufficiently for the base of the glass to slip into the coaster 12, the glass then being lowered into place.

In order to provide a drinking straw guide which makes it unnecessary for children to finger the straw through which they are sipping with the resultant crushing thereof, the head or top portion 15 of the one-piece body 10 is provided with an inclined bore 17 through which a straw 18 is inserted, the straw then passing downward into glass 14.

In order to provide for manipulation of the combined coaster and straw guide of the invention, the tail 21 of the figurine 10 is looped outward as shown, to form a handle portion integral therewith.

Figure 4:
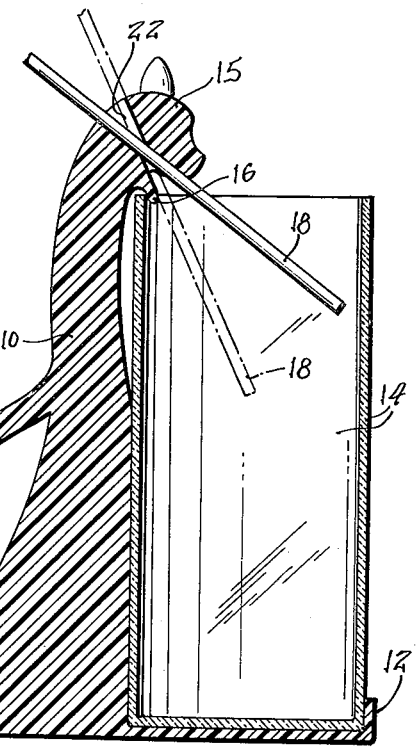
Fig. 4 is a sectional view similar to Fig. 3 but of a modified form of the invention.
Figure 5:
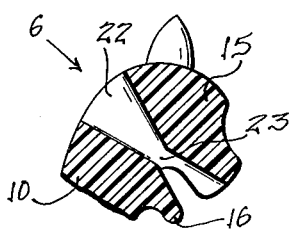
Fig. 5 is a fragmentary sectional view on the same line as Fig. 4 but with certain lines removed to clarify the construction.

In a modified form of the invention shown in Figs. 4 to 6, means are provided whereby the angular position of the straw 18 can be varied as the contents of glass 14 diminish so as to provide for the maximum efficiency of the straw without undue effort on the part of the drinker.

To this end the bore 17 in the head or top portion 15 is replaced by a slot 22 which from both limits of the head tapers to a circular hole 23 substantially in the center of the head. The construction is such that a straw 18 inserted in said slot can have its angular position varied from that shown in full lines in Fig. 4 to that shown in dot and dash lines merely by inclining the user's head.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A coaster for supporting a drinking glass and a drinking straw suspended in a drinking position in the glass, comprising a one-piece body having a vertically elongated portion extended along one side of the glass and substantially fitting the contour of the glass, a cup-shaped coaster portion formed integrally at the bottom of said elongated portion for having the bottom of the glass rested therein, said elongated portion continuing at its top end into a top portion extended inward above the top of the glass, and a portion depending from the bottom of said top portion along the inside of the glass holding the glass in position on the coaster portion, said top portion having a bore inclined downward with its bottom end opening outwardly of said depending portion for having the straw passed therethrough with its bottom end in the glass.

2. A coaster for supporting a drinking glass and a drinking straw suspended in a drinking position in the glass, comprising a one-piece body having a vertically elongated portion extended along one side of the glass, a cup-shaped coaster portion formed integrally at the bottom of said elongated portion for having the bottom of the glass rested therein, said elongated portion continuing at its top end into a top portion extended inward above the top of the glass, and a portion depending from the bottom of said top portion along the inside of the glass holding the glass in position on the coaster portion, said top portion having a bore inclined downward with its bottom end opening outwardly of said depending portion and in a direction away from said vertically elongated portion for having the straw passed therethrough with its bottom end in the glass, said bore comprising a circular portion intermediate of its ends, and outwardly flared vertically elongated slot portions extending in opposite directions from said circular portion, so constructed and arranged that the straw can be pivoted in a vertical plane in said slot portions about said circular portion as a fulcrum to a desired upwardly inclined position.

HERMAN FELDMAN.

REFERENCES CITED

The following references are of record in the file of this patent:

UNITED STATES PATENTS

| Number | Name | Date |
| --- | --- | --- |
| 269,909 | Armstrong | Jan. 2, 1883 |
| 485,510 | Staren | Nov. 1, 1892 |
| 858,393 | Horner | July 2, 1907 |
| 2,052,496 | Stassi | Aug. 25, 1936 |
| 2,085,661 | Janowski | June 29, 1937 |
| 2,469,292 | Cornwell | May 3, 1949 |

FOREIGN PATENTS

| Number | Country | Date |
| --- | --- | --- |
| 356,075 | Great Britain | Sept. 3, 1931 |